Jan. 3, 1956  L. E. HITE  2,729,237
VALVE ASSEMBLY
Filed March 20, 1953

LESTER E. HITE,
INVENTOR.

BY Lynn H. Latta

ATTORNEY.

United States Patent Office 2,729,237
Patented Jan. 3, 1956.

2,729,237

VALVE ASSEMBLY

Lester E. Hite, Los Angeles, Calif., assignor to Marman Products Company, Inc., Los Angeles, Calif., a corporation of California Application March 20, 1953, Serial No. 343,682

5 Claims. (Cl. 137—515.7)

This invention relates to valve assemblies and has as its primary object to provide a valve assembly for insertion in a fluid line, said valve assembly being such as to utilize the fluid line itself as a valve casing, thereby eliminating the conventional valve casing which usually is a casting of less tensile strength than the tubing of the fluid line (or, to gain strength, it is often quite bulky and heavy and objectionable for that reason, especially in aircraft installations where weight saving and security against failure are extremely essential considerations). To attain weight saving and low cost coupled with avoidance of failure of a valve casing is a major object of the invention.

The invention contemplates a valve assembly including a valve unit adapted to be inserted between adjoining ends of the tube sections in a fluid line, said valve unit including an annular member adapted to function both as a valve seat and as a seal between the tube sections.

More specifically, the invention contemplates a valve unit adapted to be inserted between adjoining tube sections and to establish a coupling seal between the sections, with a single joint between the tube sections bridging the valve unit.

Another object is to provide a valve assembly having a vibrating dampening, cushioned, flexible connection between a valve and a tubing line in which said valve is installed.

Figure 1:
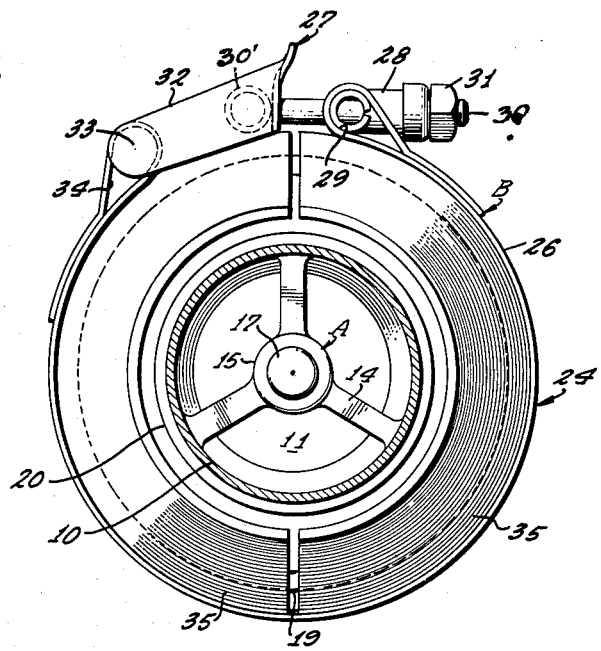
Figure 2:
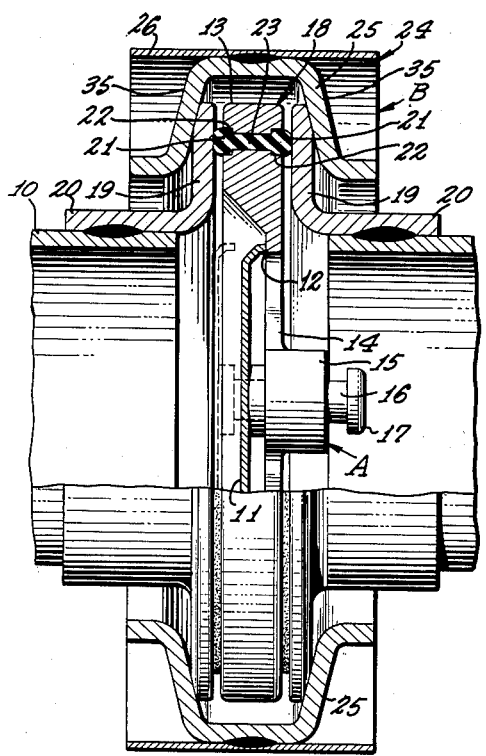

Other objects will become apparent in the ensuing specifications and appended drawings in which:

Fig. 1 is an end view of a combined valve unit and tubing coupling embodying the invention; and Fig. 2 is a view thereof partly in side elevation and partly in axial section.

Referring now to the drawings in detail, the invention provides a combined valve unit and coupling between tube sections 10, 10, said combined valve unit and coupling including a valve assembly, indicated generally at A, and a coupling assembly indicated generally at B.

The valve assembly A may comprise any type of movable valve element 11 arranged to engage a valve seat 12 for closing a port defined within the latter. Valve seat 12 constitutes a portion of an annular member 13 which may have a central spider portion 14 provided with a hub bearing 15 in which stem 16 of valve element 11 may be slidably mounted. Stem 16 may have a head 17 to limit the opening movement of valve 11 at the open position thereof indicated in dotted lines. It will now be apparent that the valve which has been shown, merely by way of illustration, is a check valve which is operable to permit flow through the fluid line in one direction and to check flow in the opposite direction.

Annular member 13 constitutes the body portion of a seal, indicated generally at 18, which is interposed as a gasket between flanges 19 of the tubing line. In order to provide a valve assembly unit which may be attached at any desired point in a tubing line, the flanges 19 may be formed with cylindrical collar portions 20, extending axially from their inner regions, whereby the valve assembly may be attached to adjoining ends of tube sections 10 as by slipping the flanges over the tube sections and welding them thereto.

Suitable means for establishing a fluid tight seal between annular member 13 and flanges 19, is provided. By way of example, I have shown, as a part of seal 18, a pair of O-rings 21, seated in annular face grooves 22 in annular member 13, and integrally joined by circumferentially spaced webs 23 extending through apertures in annular member 13. Other types of gasketing means may be utilized.

For exerting axial pressure against flanges 19, to compress O-rings 21 and establish a high pressure fluid seal, the invention provides a coupling collar indicated generally at 24, comprising a pair of semi-circular segments 25 of V-section channel material (Fig. 1), together with a constrictor band 26 which encircles the segments 25 and is adapted to apply radially constricting pressure thereto. This constricting pressure is developed by means of a take-up connector, indicated generally at 27 in Fig. 1, said connector including a tubular T-trunnion 28 journalled in a slotted loop 29 formed on one end of constrictor band 26, a T-bolt 30 extending through trunnion 28 and secured by a nut 31 engaging the end of trunnion 28, and a quickly releasable latching receptacle 32 having a pivot 33 attaching the same to a loop 34 at the other end of constrictor band 26, the T-bolt having a head 31 which is engaged in receptacle 32.

The V-channel sections 25 have frustro-conical side walls 35 which diverge toward the axis of the coupling, and which engage the flanges 19 with a wedging engagement that converts the radially constricting pressure of the V-band into axial pressure against the flanges 19.

Coupling collar 24 functions not only as the means for applying axial pressure to effect sealing of flanges 19 against seal 18, but also as the peripheral cover of a casing for the valve. In this respect, annular valve body 13 cooperates with flange members 19, 20 to define the valve casing. Flange members 19, 20 may be of drawn sheet metal, having a bursting strength at least equal to that of tube section 10. When installed in a line of tubing, flange members 19, 20 in effect become a part of the tubing line. Thus the tubing itself cooperates with seal 18 to provide the valve casing, and a conventional separate valve casing is completely eliminated. The periphery of the valve casing, insofar as its fluid sealing function is concerned, is established at the areas of contact between flanges 19 and O-rings 21. For protecting the joint or excluding dirt etc., therefrom, the coupling collar 24 forms a supplementary portion (cover) of the valve casing.

O-rings 21 are of soft rubber or synthetic rubber or other material having the general characteristics of soft rubber, whereby the entire valve unit A has a flexible, cushioned mounting in the fluid line, whereas the single joint between the tube sections 10, afforded by V-band 25, and the flanges 19 which are directly engaged thereby, provides a substantially rigid connection for installations where it is not possible to provide external support for the tubing line at the point where the valve is located. Thus the invention provides a vibration-cushioned mounting for the valve A (assisting in the dampening of flutter in the valve) within a rigid joint in a tubing line.

I claim:

1. In a valve assembly for a fluid line comprising tube sections arranged in end-to-end relation: a pair of axially opposed flange units each of L-section including a cylindrical collar surrounding and secured to an end portion of a respective tube section, and a radial flange projecting substantially directly outwardly from said collar; a valve unit comprising an annular body disposed substantially entirely between said radial flanges in close adjacency thereto and having at its inner margin an annular valve seat portion defining a valve seat and a valve opening of a diameter substantially equal to that of the tube sections, and a movable valve element carried by said annular body for valve opening and closing movements and engageable with said seat at substantially the diameter of the tube sections; means providing a seal between the annular body and said flanges restricted to an annular area outwardly of the tube section diameter; and coupling means for encasing and protecting the flanges and for drawing them together to establish a seal with the annular body, said coupling means comprising a contractile collar of V-channel section with frusto-conical, radially inwardly diverging side walls in wedging engagement with the respective flanges, and means for effecting radial contraction of said collar.

2. A valve assembly as defined in claim 1, wherein said flange units include flared intermediate portions of short radius directly joining said radial flanges to said collars and projecting beyond the ends of the tube sections to dispose the radial flanges in planes slightly offset axially beyond said ends and providing, between said annular body and said tube section ends, annular spaces disposed outwardly of the inner diameter of the tube sections, one of said spaces receiving said movable valve element in the open position thereof.

3. A valve assembly as defined in claim 1, wherein said annular body is of substantial thickness and includes a flared internal wall extending diagonally outwardly from said valve seat and defining, adjacent said seat, an annular valve chamber disposed outwardly of the inner diameter of the tube sections and receiving said movable valve element for axially directed opening and closing movements thereof.

4. A valve assembly as defined in claim 1, wherein said annular body is of substantial thickness and is provided with an annular valve chamber around said valve seat, within which said movable valve element is received.

5. A valve assembly as defined in claim 1, wherein said seal means comprises annular gaskets attached to the respective faces of said annular body and engageable with said radial flanges.

References Cited in the file of this patent

UNITED STATES PATENTS

| | | |
|---|---|---|
| 646,902 | Haberle | Apr. 3, 1900 |
| 1,119,564 | Austin | Dec. 1, 1914 |
| 1,674,879 | Atkinson | June 26, 1928 |
| 2,602,678 | Mayhoff | July 8, 1952 |
| 2,635,900 | Mayo | Apr. 21, 1953 |
| 2,653,836 | Christophersen | Sept. 29, 1953 |